(12) United States Patent
Alfayad et al.

(10) Patent No.: US 8,875,594 B2
(45) Date of Patent: Nov. 4, 2014

(54) HUMANOID ROBOT IMPLEMENTING A SPHERICAL HINGE WITH COUPLED ACTUATORS

(75) Inventors: Samer Alfayad, Bourg la Reine (FR); Fathi Ben Ouezdou, Bourg la Reine (FR); Fayçal Namoun, Courbevoie (FR)

(73) Assignee: BIA, Conflans Ste Honorine (FR)

( * ) Notice: Subject to any disclaimer, the term of this patent is extended or adjusted under 35 U.S.C. 154(b) by 579 days.

(21) Appl. No.: 12/994,874

(22) PCT Filed: May 29, 2009

(86) PCT No.: PCT/EP2009/056678
§ 371 (c)(1),
(2), (4) Date: Mar. 17, 2011

(87) PCT Pub. No.: WO2009/144320
PCT Pub. Date: Dec. 3, 2009

(65) Prior Publication Data
US 2011/0185837 A1 Aug. 4, 2011

(30) Foreign Application Priority Data

May 29, 2008 (FR) ...................................... 08 53520

(51) Int. Cl.
*B25J 17/00* (2006.01)
*B25J 17/02* (2006.01)
*B25J 18/00* (2006.01)
*B62D 57/032* (2006.01)

(52) U.S. Cl.
CPC ............. *B62D 57/032* (2013.01); *Y10S 901/18* (2013.01); *Y10S 901/28* (2013.01)
USPC ............................ 74/490.05; 901/18; 901/28

(58) Field of Classification Search
CPC ...... B21J 17/0283; B21J 3/04; B21J 17/0275; B62D 57/032

USPC ................. 74/490.01, 490.05–490.07, 490.1; 901/14, 15, 17–19, 22, 27, 29; 180/8.1, 180/8.5, 8.6

See application file for complete search history.

(56) References Cited

U.S. PATENT DOCUMENTS 4,723,460 A * 2/1988 Rosheim ..................... 74/490.06
5,394,766 A * 3/1995 Johnson et al. ............. 74/490.01

(Continued)

FOREIGN PATENT DOCUMENTS

| EP | 1 433 694 | 6/2004 |
|---|---|---|
| JP | 2004 017248 | 1/2004 |
| JP | 2006 015472 | 1/2006 |

OTHER PUBLICATIONS

Lenarcic J, et al.: "Kinematic design of a humanoid robotic shoulder complex," Robotics and Automation, 2000 Proceedings, ICRA '00, IEEE International AL Conference on, Piscataway, NJ, USA IEEE, vol. 1, Apr. 24, 2000, pp. 27-32, XPOI0S00195.

*Primary Examiner* — Troy Chambers
*Assistant Examiner* — Jake Cook
(74) *Attorney, Agent, or Firm* — Baker and Hostetler LLP

(57) ABSTRACT

A humanoid robot includes a spherical joint with three degrees of freedom in rotation about three axes, the spherical joint connecting a first element and a second element of the robot, and three actuators for moving the spherical joint. The three actuators include a first actuator coupled to the first element, a second actuator coupled to the second element and the first actuator, and a third actuator coupled to the second element and the first actuator. The second actuator and the third actuator act in parallel and coupled together. The first actuator acts in series with the second actuator and the third actuator about a first axis of the three axes. An angular range of movement about the first axis is greater than an angular range of movement about either a second axis or a third axis of the three axes.

13 Claims, 10 Drawing Sheets

(56) References Cited

U.S. PATENT DOCUMENTS

| | | | |
|---|---|---|---|
| 5,845,540 A * | 12/1998 | Rosheim | 74/490.05 |
| 6,067,892 A * | 5/2000 | Erickson | 92/92 |
| 6,658,962 B1 * | 12/2003 | Rosheim | 74/490.05 |
| 6,832,131 B2 * | 12/2004 | Hattori et al. | 700/245 |
| 2006/0207419 A1 * | 9/2006 | Okazaki et al. | 91/35 |

* cited by examiner

HUMANOID ROBOT IMPLEMENTING A SPHERICAL HINGE WITH COUPLED ACTUATORS

CROSS-REFERENCE TO RELATED APPLICATIONS

This application is a National Stage of International patent application PCT/EP2009/056678, filed on May 29, 2009, which claims priority to foreign French patent application No. FR 08 53520, filed on May 29, 2008, the disclosures of which are incorporated by reference in their entirety.

FIELD OF THE INVENTION

The invention relates of a humanoid robot using a spherical joint with coupled actuators and a method using the articulation. The invention is of particular utility in the production of humanoid robots coming closest to human anthropomorphism. For example, the spherical joint according to the invention can be used for a hip, a shoulder or a joint between a pelvis and a trunk of the robot.

BACKGROUND OF THE INVENTION

A mathematical model describing this anthropomorphism was developed in the 1960s in the United States by Aerospace Medical Research Laboratories in Dayton, Ohio. This model, well known as the Hanavan model, describes in a parametric manner, relative to given human size and weight, the dimensions of all the parts of the body. For example, the hip is described as a joint having three degrees of freedom in rotation. The dimensions of the hip and of the parts of the body surrounding it, pelvis and thigh, are also described. For example, for a 14-year-old adolescent 1.6 m tall and weighing 50 kg, the thigh can be represented by a truncated cone 392 mm high, with 46 mm for the small radius and with 74 mm for the large radius. For the same robot and using this model, the pelvis is represented by a parallelepiped 189 mm high, 230 mm wide and 160 mm deep. The distance between the two hips is equal to twice the large radius of the thigh. The height of the thigh is defined as the distance between the joint formed by the hip and that formed by the knee.

A dynamic calculation shows that, to achieve a gait at a speed of 1.2 m/s, and still for a robot of 1.6 m and 50 kg, the joint of the hip in the sagittal plane requires a torque of the order of 45 N·m, with a maximum speed of 2.7 rad/s, and an articular range of movement from −30° to +30°. Conversely, in the frontal plane, the joint requires a torque of the order of 35 N·m, with a maximum speed of the order of 1 rad/s and a motion range from −5° to +10°.

Currently, many humanoid robots have been developed, but not one complies with the Hanavan model, notably with respect to the size of the leg and the shoulder. For example, there are robots of which the hip is reduced to a universal joint type, that is to say comprising only two degrees of freedom, a rotation in the sagittal plane and a rotation in the frontal plane. Moreover, the actuation mechanisms used to motorize these two degrees of freedom, following the parameters originating from the dynamic calculation, depart from the dimensions specified in the Hanavan model. There are also robots in which the angular range of movement of the hip in the sagittal plane of the robot does not make it possible to obtain a sufficient step length to obtain a walking speed of the robot that is similar to that of a human.

SUMMARY OF THE INVENTION

It is therefore an object of the present invention to improve the match between the production of a robot and the human anatomy, for example approached by the Hanavan model.

It is a further object of the present invention to provide a humanoid robot comprising a spherical joint with three degrees of freedom in rotation connecting two elements of the robot, the joint being moved by three actuators of which a first actuator and a second actuator act in parallel and are coupled together, and of which a third actuator acts in series with the first two actuators about an axis, characterized in that the axis of the third actuator is the axis of which the angular range of movement must be the greatest in order to come close to human anthropomorphism.

A further object of the invention is a method for actuating a humanoid robot in which the joint comprises two cylinders, the method being characterized in that, to move the joint on a first axis of the articulation, action is taken simultaneously on the two cylinders in the same direction and in that to move the joint on a second axis of the articulation, action is taken simultaneously on the two cylinders in opposite directions.

In the case of the hip, by virtue of three degrees of freedom, respectively in a frontal plane, a sagittal plane and a horizontal plane, the gait of a humanoid robot using a hip according to the invention will be much more anthropomorphic, notably with respect to its great angular range of movement in the sagittal plane. Coupling the actuators allowing the rotations about a vertical and frontal axis makes it possible to reduce the volume of the joint. Conversely, this coupling limits the angular range of movement about the axis in question. The third actuator allowing the rotation about an axis perpendicular to the sagittal plane is kept independent of the other two which makes it possible to reach a considerable angular range of movement for this third actuator. In the invention, the choice is made to use this third independent actuator for the predominant movement of the articulation, that is to say the rotation requiring the largest angular range of movement in human anthropomorphism, for example as defined in the Hanavan model.

BRIEF DESCRIPTION OF THE DRAWINGS

The invention will be better understood and other advantages will appear on reading the detailed description of an embodiment given as an example, which description is illustrated by the appended drawing in which.

For the purposes of clarity, the same elements will bear the same reference numbers in the various figures. The drawing is given as an illustration and is not fully to scale.

DETAILED DESCRIPTION

Figure 1:
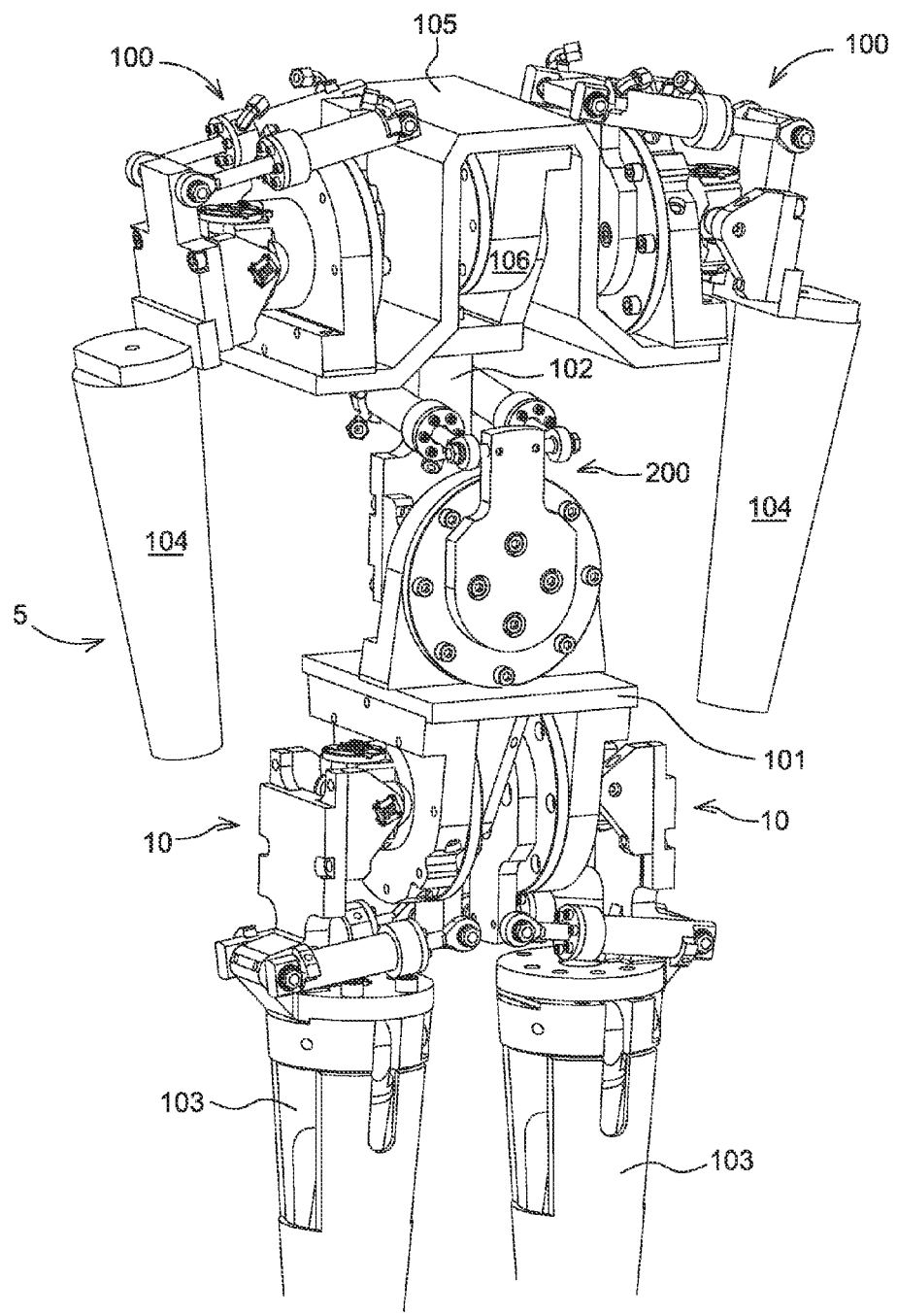
FIG. 1 represents in perspective a humanoid robot comprising several spherical articulations according to the invention.

FIG. 1 represents in perspective a humanoid robot 5 comprising several spherical joints according to the invention including two hips 10, two shoulders 100 and a joint 200 between a pelvis 101 and a trunk 102 of the robot 5. Each hip 10 links a thigh 103 to the pelvis 101. Each shoulder 100 links an arm 104 to a torso 105 of the robot 5. It is possible to place between the trunk 102 and the torso 105 a joint 106 with a degree of freedom in rotation about a sagittal axis of the robot 5. By convention, the sagittal axis is an axis perpendicular to the sagittal plane. A vertical plane is a plane in which the walking movement of the robot mainly takes place. Similarly, the frontal axis is an axis perpendicular to the frontal plane of the robot. The frontal plane is vertical and perpendicular to the sagittal plane. Finally, the vertical axis is an axis formed by the intersection between the sagittal plane and the frontal plane.

Figure 2:
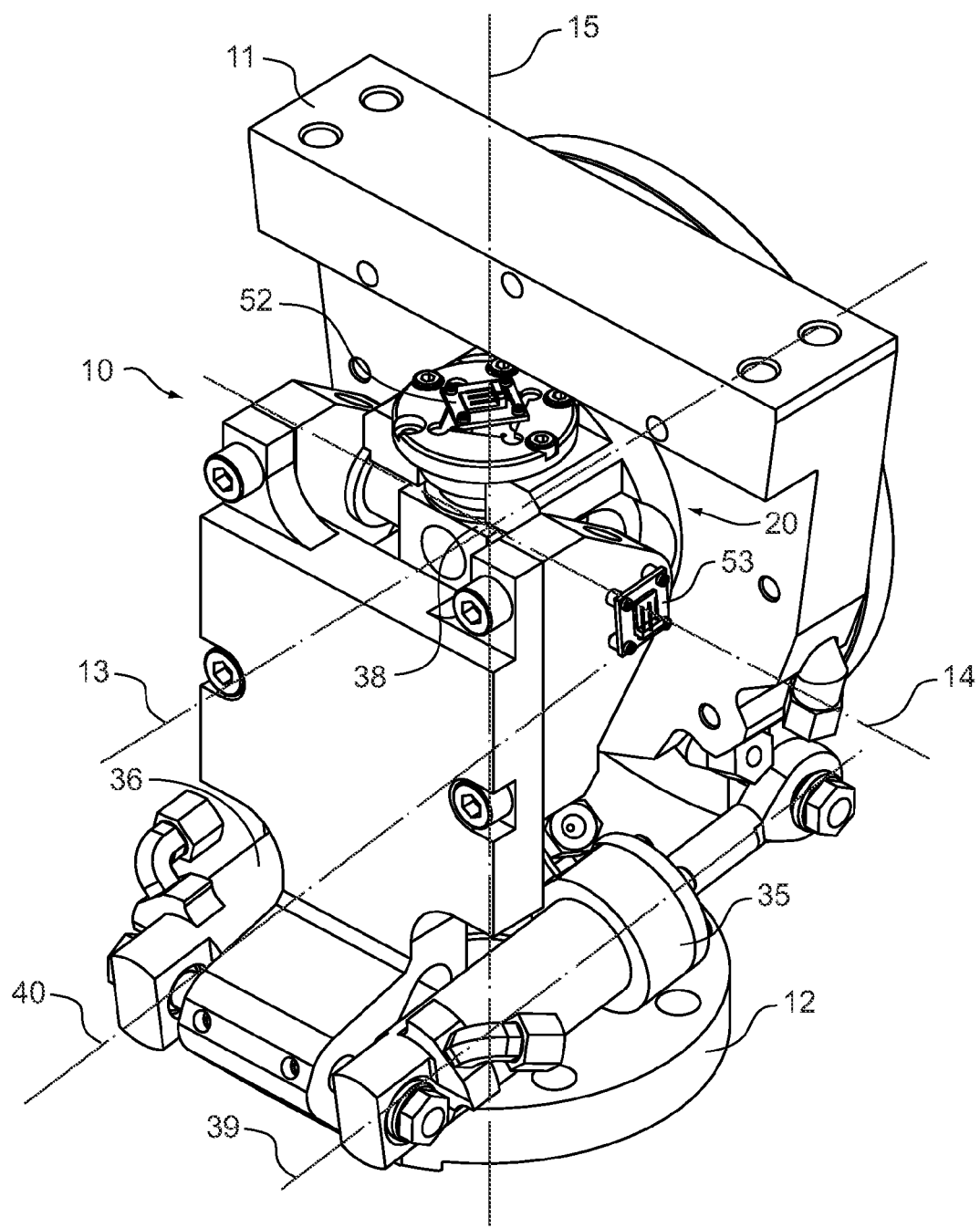
FIG. 2 represents in perspective a hip according to the invention.

FIG. 2 represents a hip 10 according to the invention. The hip 10 comprises a first interface part 11 secured to the pelvis 101 and a second interface part 12 secured to the thigh 103. So as not to overload the various figures, neither the pelvis nor the thigh is shown and only the elements of the hip 10 linking the two interface parts 11 and 12 are shown.

The hip 10 comprises three actuators each making it possible to rotate the thigh relative to the pelvis about an axis, the three axes being distinct. More precisely, in the example shown, the first axis 13 is a sagittal axis, the second axis 14 is a frontal axis and the third axis 15 is vertical.

The actuators can use either hydraulic or electric power.

Figure 3:
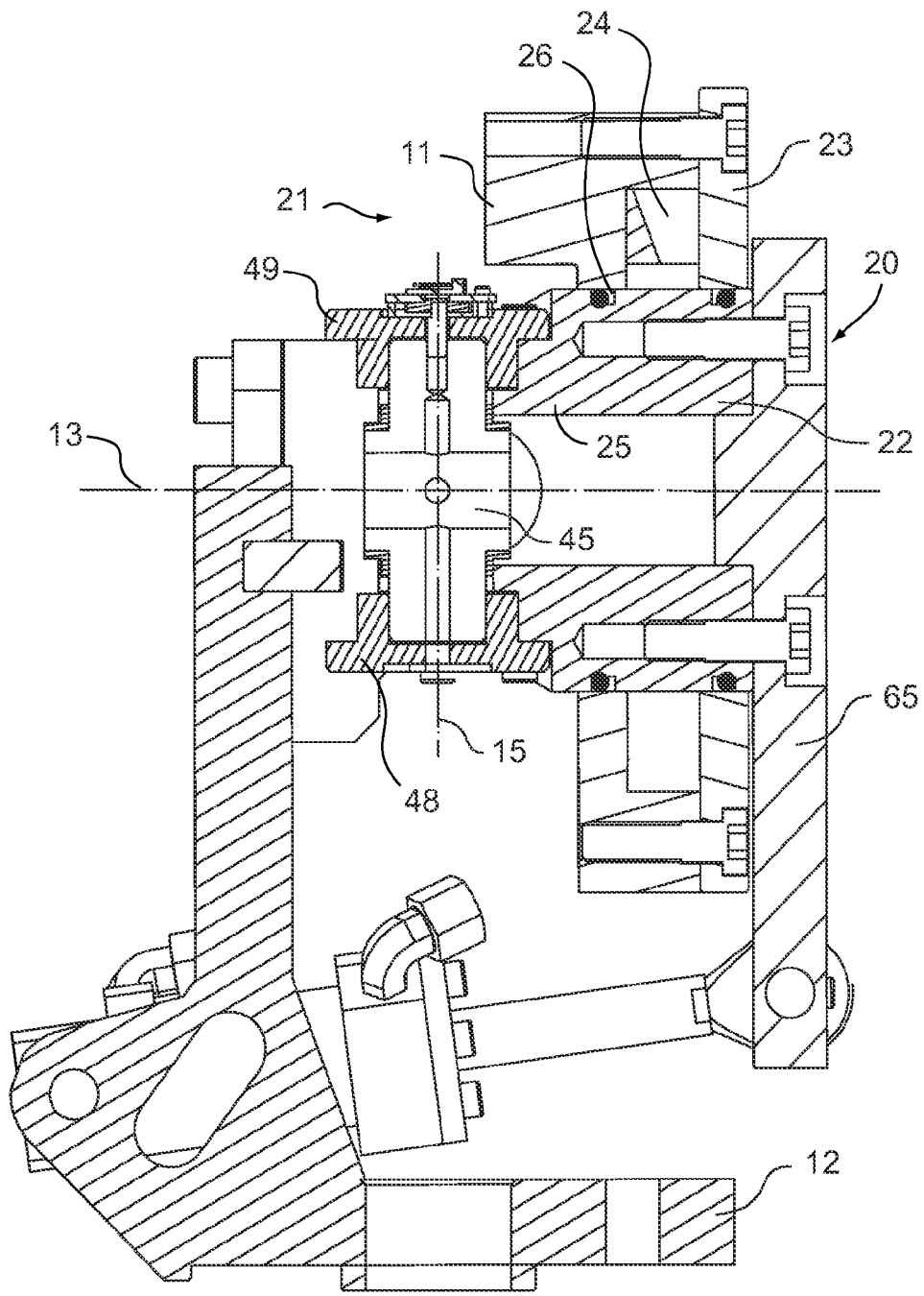
FIG. 3 represents a hip in section in a frontal plane.

FIG. 3 represents the hip in section in a frontal plane. This figure makes it easier to view the actuators. The actuator making it possible to move the hip about the sagittal axis 13 is a hydraulic rotary motor 20 comprising a stator 21 and a rotor 22. The stator 21 is formed of the interface part 11 and of a closure plate 23. An annular groove 24 is made in the interface part 11 and is closed by the plate 23.

Figure 4:
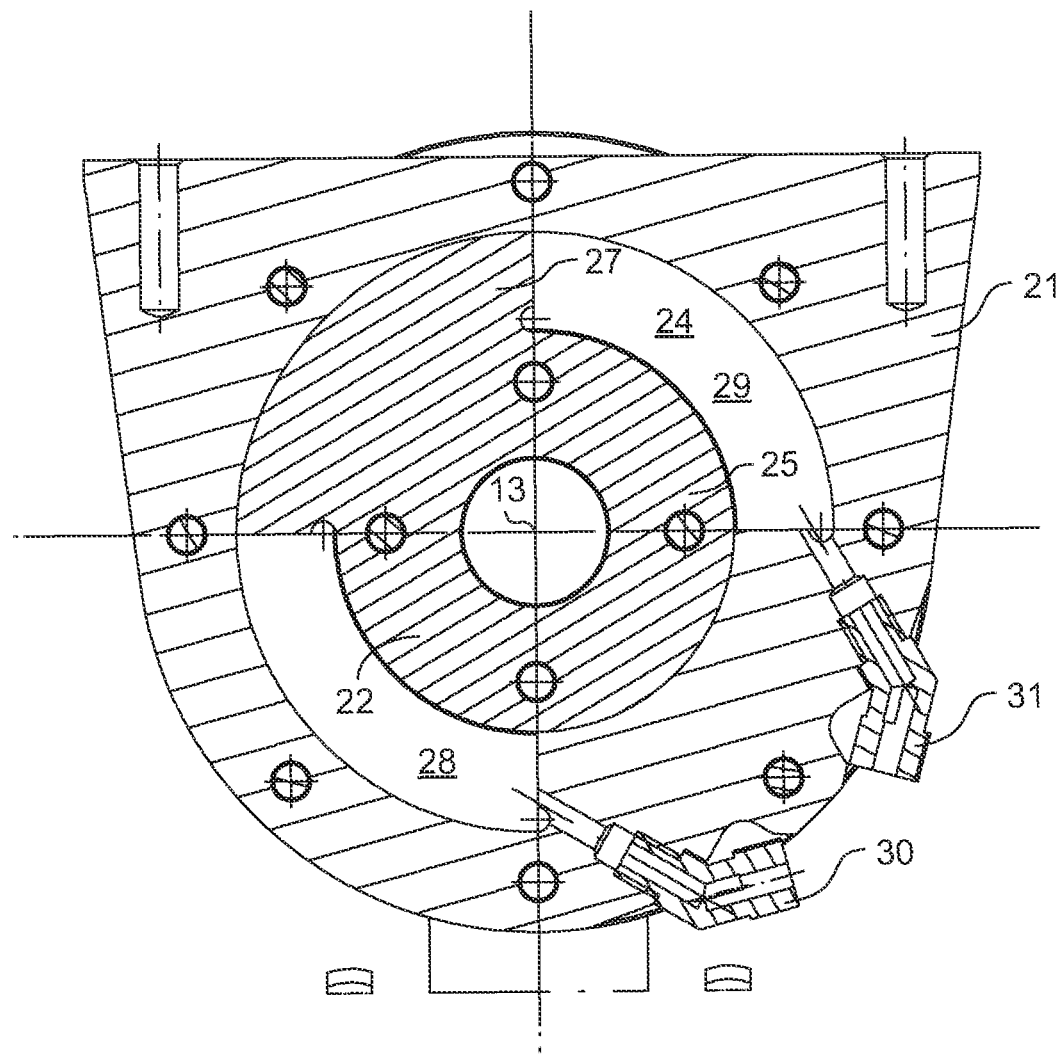
FIG. 4 represents in section one of the actuators of the hip.

FIG. 4 represents in section in a vertical plane, passing through the annular groove 24, the stator 21 and the rotor 22. The annular groove 24 extends over 270° about the axis 13. The rotor 22 comprises a tubular shaft 25 that can rotate in a bore 26 made in both the interface part 11 and the plate 23. The rotor 22 also comprises a butterfly valve 27 that can move in the groove 24. The butterfly valve 27 and the tubular shaft 25 form a single mechanical part. The bore 26 extends on the sagittal axis 13. The butterfly valve 27 covers the groove 24 in an arc of a circle of 90° about the sagittal axis 13.

The difference in angular dimension between the butterfly valve 27 and the groove 24 allows two free spaces to remain on either side of the butterfly valve 27. These spaces form two chambers 28 and 29 in which it is possible to deliver a hydraulic fluid via connections, respectively 30 and 31. A difference in pressure of the fluid between the two chambers 28 and 29 makes it possible to turn the rotor 22 relative to the stator 21. This difference in pressure may be generated by a hydraulic pump installed on board the robot. In order to improve the independence between the various actuators, it is possible to provide a pump dedicated to each actuator. The various pumps may be housed in the thigh or in the pelvis as close as possible to the actuators in order to limit the length of the hydraulic pipes linking each pump to the associated actuator. In FIG. 3, the rotor 22 is shown in the central position relative to the stator 21 allowing a range of movement of + or −90° relative to this central position. Other angular dimensions for the butterfly valve 27 and the groove 24 make it possible to increase or reduce, depending on the need of the joint, the amplitude of the angular movement of the rotor 22 relative to the stator 21.

The hip 10 comprises two actuators 35 and 36 acting in parallel on the thigh. These two actuators rotate the thigh about the frontal axis 14 and the vertical axis 15. This parallel action makes it possible to prevent one of the actuators from supporting the other. It is, for example, possible to produce a motorized joint with three degrees of freedom in rotation based on three rotary motors assembled in series. More precisely, the rotor of one motor is secured to the stator of the motor that follows it in the kinematic chain. This design, providing actuators in series, makes it necessary to dimension the actuator that is upstream in the kinematic chain so that it is capable of supporting the load of the downstream actuator in addition to the load of the object to be moved, in this instance the thigh. A hip according to the invention ensures that at least two of the three actuators act in parallel. In other words, the two actuators act directly, between the elements to be moved, without passing through the other actuator. Any one of the parallel actuators does not support the load induced by the other actuator but only that generated by the object to be moved, which makes it possible to reduce its dimensions. In the example described, the hip 10 comprises two actuators acting in parallel.

Accordingly, the hip 10 comprises a connection 37 with two degrees of freedom in rotation on intersecting axes, the frontal axis 14 and the vertical axis 15. The connection 37 may be like a connection of the universal joint type. The point of intersection of the two axes 14 and 15 bears the reference number 38. The connection 37 links two elements which are, in the example shown, the rotor 22 and the interface part 12. The connection 37 is motorized by means of two actuators 35 and 36 which are each formed of a linear cylinder placed between the rotor 22 and the interface part 12. Each cylinder 35 and 36 allows a movement on one axis, respectively 39 and 40. The point of intersection 38 of the axes 14 and 15 is not located on the axes of the cylinders so that an action on the cylinders can move the connection 37. In the example described, the connection 37 and its motorization are supported by the rotor 22. In other words, the connection 37 is downstream of the motor 20 in the kinematic chain of the hip 10. It is also possible to provide a motorized connection with two degrees of freedom upstream of the motor 20.

Advantageously, the connection 37 comprises a crossing shaft 45 that can pivot about an axis of the connection 37 relative to a first of the two elements and about the other axis of the connection 37 relative to a second of the two elements. In the example shown, the crossing shaft 45 can pivot about the vertical axis 15 relative to the rotor 22 and about the frontal axis 14 relative to the interface part 12 secured to the thigh.

Figure 5:
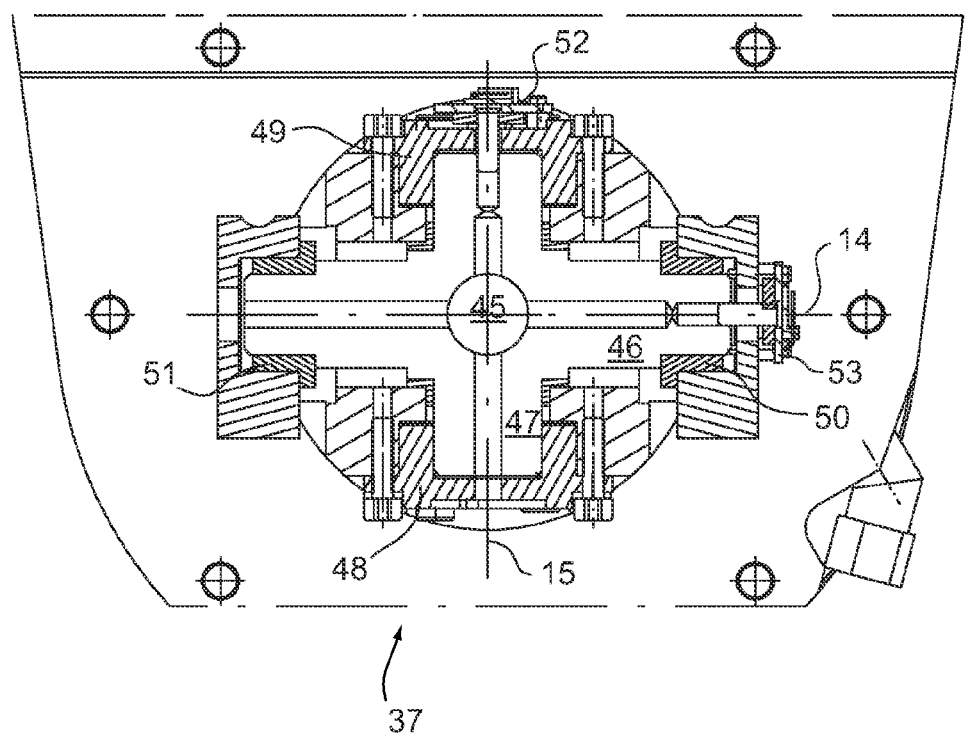
FIG. 5 represents in section a crossing shaft of the hip.

FIG. 5 represents in section the connection 37 in a plane containing the axes 14 and 15. The crossing shaft 45 is formed of two shafts 46 and 47 that are secured and perpendicular. The shaft 46 extends on the frontal axis 14 and the shaft 47 extends on the vertical axis 15. Two bearings 48 and 49 allow the shaft 47 to rotate relative to the rotor 22 and two bearings 50 and 51 allow the shaft 46 to rotate relative to the interface part 12. To ascertain the angular movement of the hip 10 on the axes 14 and 15, it is possible to have, in each of the bearings 49 and 50, a potentiometer respectively 52 and 53, delivering an item of electrical information as a function of the angular position of the crossing shaft 45 relative to the rotor 22 and to the interface part 12, a potentiometer which will be used for the control of the connection 37 via a control device (not shown). It is also possible to fit the rotary motor 20 with a potentiometer making it possible to ascertain the angular position of the thigh about the sagittal axis 13.

Figure 6:
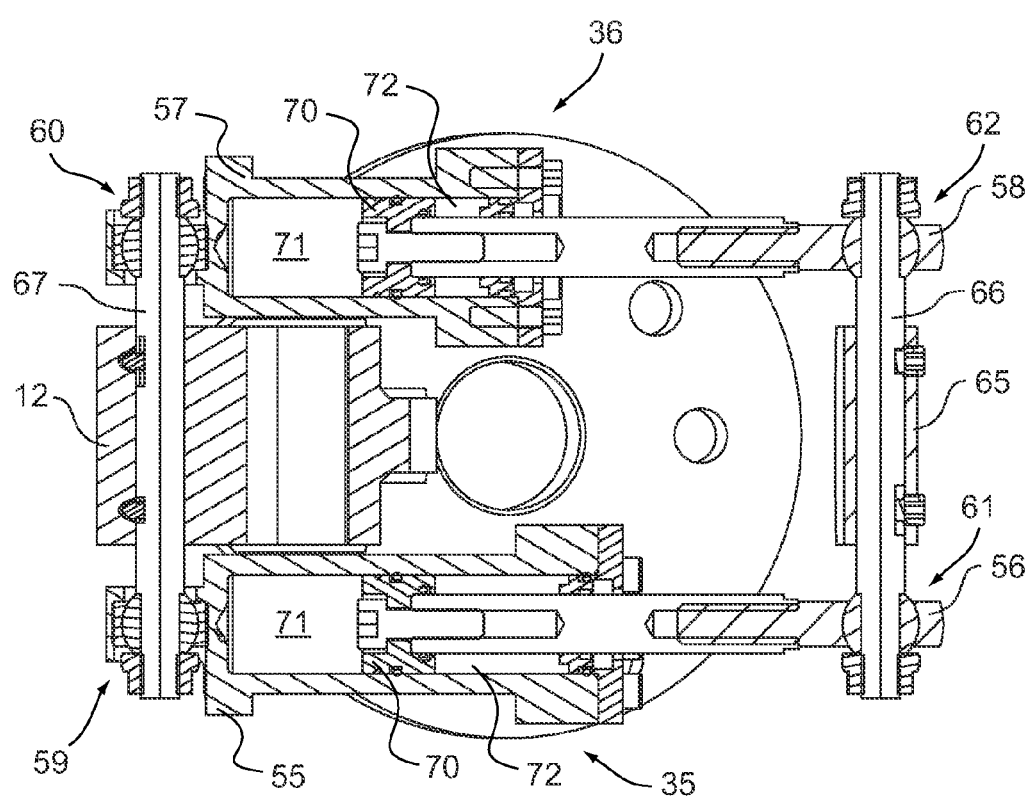
FIG. 6 represents in section two other actuators of the hip.

The axes 39 and 40 of the two linear cylinders 35 and 36 are advantageously parallel with one another. It is well understood that this parallelism exists only in a particular position of the connection 37, for example the position in which a robot fitted with the hip 10 is upright in balance without walking. FIG. 6 is a view in section of the hip 10 in a plane containing the axes of the cylinders 35 and 36 when the latter are parallel. The axes 39 and 40 can be substantially parallel with the sagittal axis 13. The cylinders 35 and 36 are for example double-effect hydraulic cylinders. Each cylinder has two ends 55 and 56 for the cylinder 35 and 57 and 58 for the cylinder 36. To allow the independence of movement of the two cylinders, the ends 55 and 57 are each linked to the interface part 12 via a revolve joint, respectively 59 and 60. Similarly, the ends 56 and 58 are each linked to the rotor 22 via a swivel joint, respectively 61 and 62.

The connection of the cylinders 35 and 36 to the rotor 22 can be achieved by means of a plate 65 secured to the tubular shaft 25 of the rotor 22. The plate 65 extends in a sagittal plane. A rod 66 is secured in its middle to the bottom of the plate 65. The swivel joints 61 and 62 are placed at the ends of the rod 66 on either side of the plate 65. Similarly, a rod 67 is secured to the interface part 12 and the swivel joints 59 and 60 are placed at the ends of the rod 67 on either side of the interface part 12.

The cylinders 35 and 36 are advantageously hydraulic. They then each comprise a piston 70 separating two chambers 71 and 72 of the cylinders. As for the rotary motor 20, the chambers 71 and 72 are supplied by a difference in pressure of a hydraulic fluid.

When the two cylinders 35 and 36 are actuated in the same direction, for example when on the one hand the ends 57 and 58 of the cylinder 36 and on the other hand the ends 55 and 56 of the cylinder 35 come closer together simultaneously, the interface part 12 turns relative to the rotor 22 about the frontal axis 14. Conversely, when the two cylinders 35 and 36 are actuated simultaneously in opposite directions, the interface part 12 turns relative to the rotor 22 about the vertical axis 15.

Figure 7:
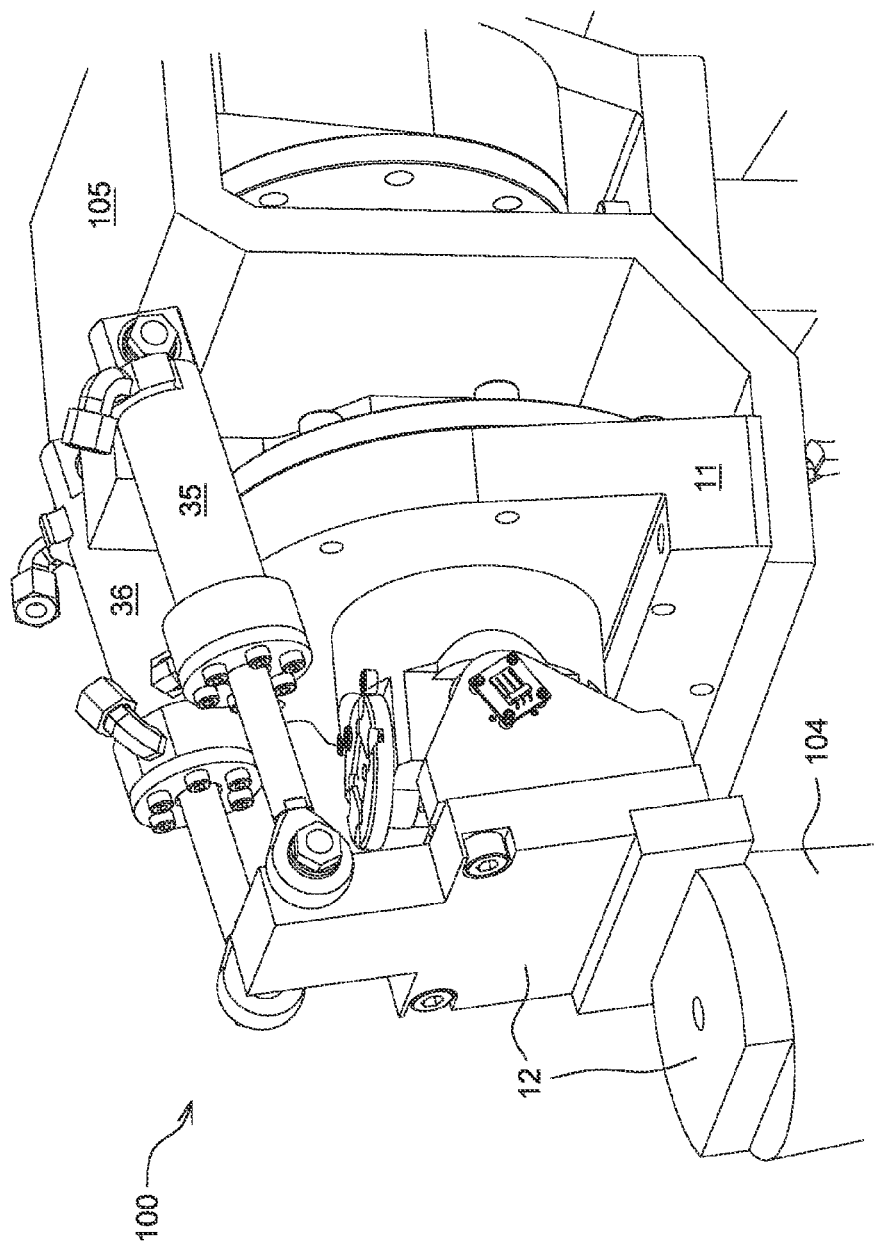
FIG. 7 represents in perspective a shoulder according to the invention.
Figure 8:
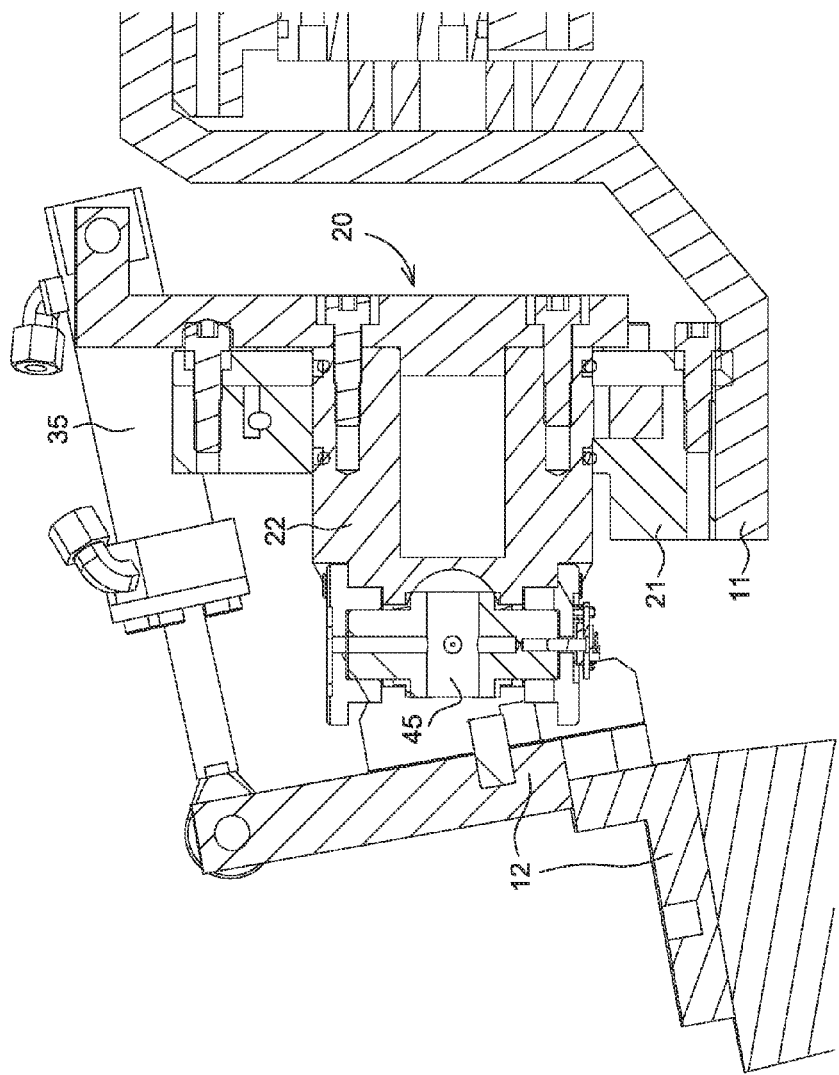
FIG. 8 represents in section the shoulder of FIG. 7.

FIGS. 7 and 8 represent a shoulder 100 according to the invention. FIG. 7 is a view in perspective of the shoulder 100 and FIG. 8 is a view in section. The shoulder 100 links the torso 105 and an arm 104. The interface part 11 is secured to the torso 105 and the interface part 12 is secured to the arm 104.

The shoulder 100 contains the actuator 20 in the form of a hydraulic motor allowing the arm to rotate about the sagittal axis of the robot 5. There are also two actuators 35 and 36 allowing the arm 104 to rotate about the frontal axis and the vertical axis of the robot 5. The two actuators 35 and 36 are coupled together and the actuator 20 is independent of the other two thus allowing a large angular range of movement of the arm in the sagittal plane. This rotary movement is for example that which is predominant when the robot 5 is walking in order to balance its body.

Figure 9:
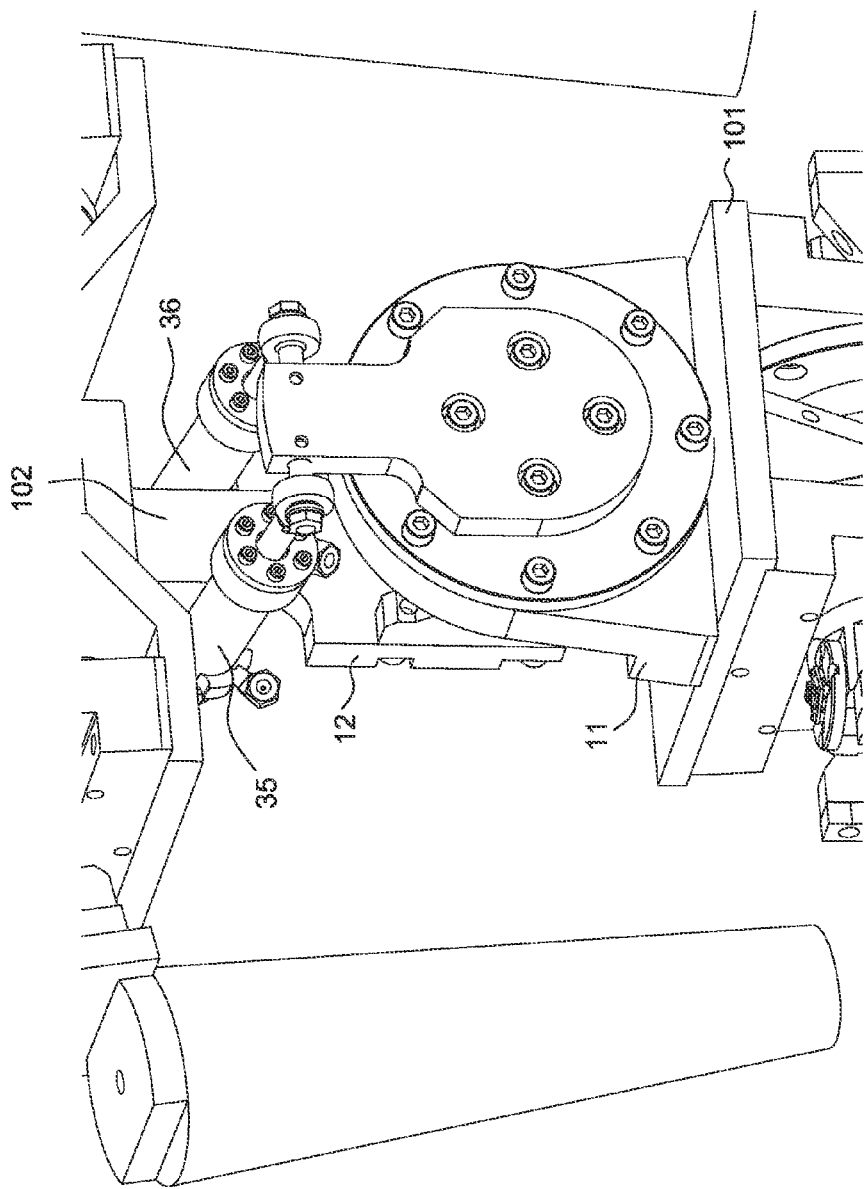
FIG. 9 represents in perspective a joint according to the invention between a pelvis and a trunk of the robot.
Figure 10:
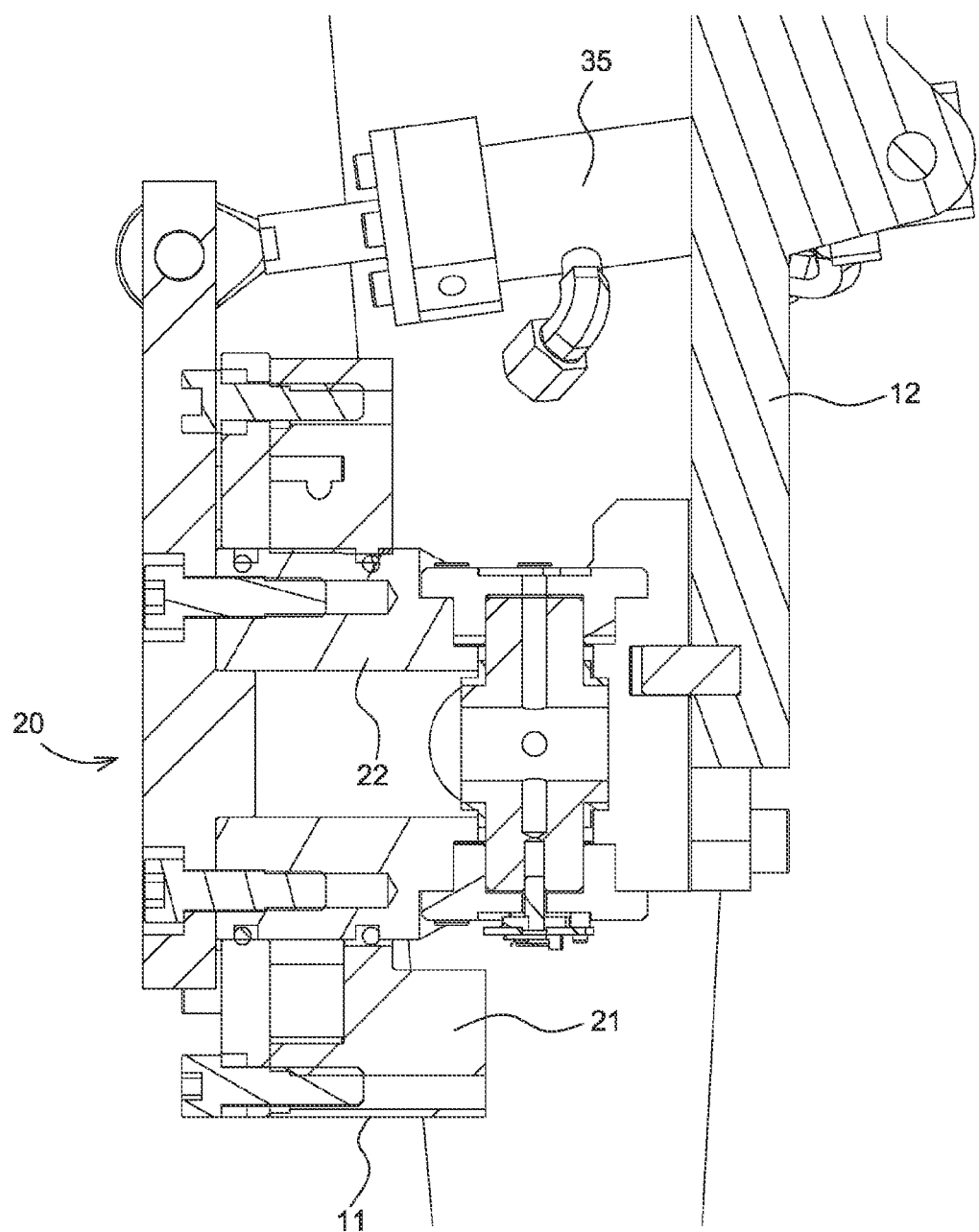
FIG. 10 represents in section the joint of FIG. 9.

FIGS. 9 and 10 represent a joint 200 between the pelvis 101 and the trunk 102 of the robot 5. FIG. 9 is a view in perspective of the shoulder 100 and FIG. 10 is a view in section. The interface part 11 is secured to the pelvis 101 and the interface part 12 is secured to the trunk 102.

In the joint 200, there is the actuator 20 in the form of a hydraulic motor allowing the trunk 102 to rotate about the frontal axis of the robot 5. There are also the two actuators 35 and 36 allowing the trunk 102 to rotate about the sagittal axis and the vertical axis of the robot 5. The two actuators 35 and 36 are coupled together and the actuator 20 is independent of the other two thus allowing a large angular range of movement of the trunk 102 in the frontal plane. This range of movement helps to increase the lateral working space of the robot 5. In other words, when the robot 5 keeps its feet on the ground without moving, its scope of working the hands is increased because of this range of movement of the trunk in the frontal plane.

In the three examples of joint described above, the stator 21 of the actuator 20 is advantageously secured to the element of the robot 5 that is farthest upstream relative to the center of gravity of the robot 5. For the hip, the element farthest upstream is the pelvis 101, for the shoulder 100, the element farthest upstream is the torso 105 and for the joint 200, the element farthest upstream is the pelvis 101. It is considered that the center of gravity of the robot 5 is situated substantially in its pelvis 101. More generally, expressed in a kinematic manner, in a joint with three axes of rotation, there is one axis which supports the other two. The actuator 20 supports the other two actuators 35 and 36.

The invention claimed is:

1. A humanoid robot comprising:
   a spherical joint with three degrees of freedom in rotation about three axes, the spherical joint connecting a first element and a second element of the robot; and
   three actuators for moving the spherical joint, the three actuators including
      a first actuator including a rotor and a stator, the stator being fixed to the first element,
      a second actuator fixed to the second element at a first location and fixed to the rotor of the first actuator at a second location, and
      a third actuator fixed to the second element at a third location and fixed to the rotor of the first actuator at a fourth location,
   wherein the second actuator and the third actuator act in parallel,
   wherein the first actuator acts in series with the second actuator and the third actuator about a first axis of the three axes, and
   wherein an angular range of movement about the first axis is greater than an angular range of movement about either a second axis or a third axis of the three axes.

2. The humanoid robot as claimed in claim 1, further comprising:
   a third element linked to a fourth element via a connection with two degrees of freedom in rotation about the second axis and the third axis intersecting at a point and moved by the second actuator and the third actuator,
   wherein the second actuator and the third actuator are each formed of a linear cylinder located between the third element and the fourth element, each linear cylinder moving along a longitudinal axis, and
   wherein the point of intersection of the second axis and the third axis is not situated on the longitudinal axis of either linear cylinder.

3. The humanoid robot as claimed in claim 2, wherein the connection includes a crossing shaft configured to rotate about an axis of the connection relative to the third element and about the other axis of the connection relative to the fourth element.

4. The humanoid robot as claimed in claim 2, wherein the longitudinal axis of one linear cylinder is parallel to the longitudinal axis of the other linear cylinder.

5. The humanoid robot as claimed in claim 1, wherein the first actuator is a rotary motor that actuates the spherical joint.

6. The humanoid robot as claimed in claim 1, wherein the first element is disposed furthest upstream relative to a center of gravity of the humanoid robot.

7. The humanoid robot as claimed in claim 1, wherein the first actuator, the second actuator, and the third actuator are driven by hydraulic energy.

8. The humanoid robot as claimed in claim 1, wherein the spherical joint is a hip,
    wherein the first element is a thigh and the second element is a pelvis,
    wherein the first axis is a sagittal axis, the second axis is a frontal axis, and the third axis is a vertical axis, and
    wherein the second actuator and the third actuator effect rotation about a frontal axis and a vertical axis by acting in parallel on the thigh.

9. The humanoid robot as claimed in claim 1, wherein the spherical joint is a shoulder,
    wherein the first element is an arm and the second element is a torso,
    wherein the first axis is a sagittal axis, the second axis is a frontal axis, and the third axis is a vertical axis, and
    wherein the second actuator and the third actuator effect rotation about a frontal axis and a vertical axis by acting in parallel on the arm.

10. The humanoid robot as claimed in claim 1, wherein the first element is a pelvis and the second element is a trunk, wherein the first axis is a frontal axis, the second axis is a sagittal axis, and the third axis is a vertical axis, and
    wherein the second actuator and the third actuator effect rotation about a sagittal axis and a vertical axis by acting in parallel on the trunk.

11. A method for actuating the humanoid robot as claimed in claim 2, wherein to move the spherical joint on the first axis of the connection, action is taken simultaneously on each linear cylinder in the same direction, and
    wherein to move the spherical joint on the second axis of the connection, action is taken simultaneously on each linear cylinder in opposite directions.

12. The humanoid robot as claimed in claim 3, wherein the longitudinal axis of one linear cylinder is parallel to the longitudinal axis of the other linear cylinder.

13. The humanoid robot as claimed in claim 1, wherein the rotor of the first actuator is coupled to the second element.

* * * * *